(12) United States Patent
Minne et al.

(10) Patent No.: US 6,912,893 B2
(45) Date of Patent: Jul. 5, 2005

(54) APPARATUS AND METHOD FOR IMPROVING TUNING OF A PROBE-BASED INSTRUMENT

(75) Inventors: Stephen C. Minne, Santa Barbara, CA (US); Hector B. Cavazos, Santa Barbara, CA (US)

(73) Assignee: Veeco Instruments Inc., Woodbury, NY (US)

( * ) Notice: Subject to any disclaimer, the term of this patent is extended or adjusted under 35 U.S.C. 154(b) by 0 days.

(21) Appl. No.: 10/417,506

(22) Filed: Apr. 17, 2003

(65) Prior Publication Data

US 2004/0206165 A1 Oct. 21, 2004

(51) Int. Cl.[7] .......................... G01N 13/16; G01B 5/28
(52) U.S. Cl. ........................................................ 73/105
(58) Field of Search ........................... 73/105; 250/306, 250/307

(56) References Cited

U.S. PATENT DOCUMENTS

| | | | | |
|---|---|---|---|---|
| 5,253,515 A | * | 10/1993 | Toda et al. .................... 73/105 |
| 5,319,960 A | * | 6/1994 | Gamble et al. ................ 73/105 |
| 5,423,514 A | * | 6/1995 | Wakiyama et al. ....... 250/559.3 |
| 5,481,908 A | * | 1/1996 | Gamble ........................ 73/105 |
| 5,705,814 A | * | 1/1998 | Young et al. ................ 250/306 |
| 5,714,756 A | * | 2/1998 | Park et al. ................... 250/306 |
| 5,717,132 A | * | 2/1998 | Watanabe et al. ............. 73/105 |
| 6,057,546 A | * | 5/2000 | Braunstein et al. .......... 250/306 |

* cited by examiner

*Primary Examiner*—Daniel S. Larkin
(74) *Attorney, Agent, or Firm*—Boyle Fredrickson Newholm Stein & Gratz S.C.

(57) ABSTRACT

A method of operating a probe-based instrument includes providing a probe assembly and a probe holder and oscillating a probe of the probe assembly with an actuator that generates oscillation energy. The method also includes mounting the probe assembly on the probe holder so as to lessen interference with the oscillation energy coupled to the tip of the probe. A corresponding probe assembly includes a base having two substantially opposed surfaces and a cantilever extending from the base and supporting a tip. The probe assembly is mounted in a probe holder such that a probe holder surface contacts one of the opposed surfaces. The one opposed surface preferably includes at least one opening such that the surface area of the one opposed surface is substantially less than the surface area of the probe holder surface.

16 Claims, 3 Drawing Sheets

APPARATUS AND METHOD FOR IMPROVING TUNING OF A PROBE-BASED INSTRUMENT

BACKGROUND OF THE INVENTION

1. Field of the Invention

The present invention is directed to probe-based instruments such as an atomic force microscope and, more particularly, to probe assemblies for such instruments and corresponding methods to optimize tuning of the instrument.

2. Description of Related Art

Probe-based instruments monitor the interaction between a probe and a sample to obtain information concerning one or more characteristics of the sample. Scanning probe microscopes (SPMs) typically characterize the surface of the sample down to atomic dimensions by monitoring the interaction between the sample and a tip supported by a corresponding cantilever of the probe assembly by providing relative scanning movement between the tip and the sample. As a result, surface characteristic data can be acquired over a particular region of a sample, and a corresponding map of the sample can be generated.

The atomic force microscope (AFM) is a very popular type of SPM in both commercial and research environments. The probe assembly of a typical AFM includes a micron-sized cantilever supported at its base which may define, for example, a silicon cantilever extending from a silicon die section. The cantilever typically has a sharp probe tip attached to the free end opposite the base for interacting with the sample surface. In operation, the probe tip is brought very near or into contact with the surface of the sample to be examined, and the deflection of the cantilever in response to the probe tip's interaction with the sample is measured with a highly sensitive deflection detector, most preferably an optical lever system employing a laser and a quadrant photodetector. Other deflection detection schemes include strain gauge arrangements, an arrangement of capacitance sensors, etc.

In operation, the probe assembly, and more particularly, the tip of the cantilever scans the sample surface using a high resolution three-axis scanner (e.g., a piezoelectric actuator) acting on either the sample support or the probe assembly. As a result, the instrument is capable of creating relative motion between the probe and the sample while measuring a surface characteristic such as topography or some other property of the sample.

Notably, AFMs may be designed to operate in a variety of modes, including contact mode and oscillating modes. With specific reference to oscillating modes, one preferred mode of operation causes the tip to tap on the sample surface. In this mode of operation, the tip is oscillated at or near a resonant frequency of the cantilever of the probe using a transducer such as a piezoelectric actuator. The amplitude or phase of this oscillation is kept constant during scanning using feedback signals which are generated in response to the tip-sample interaction. The feedback signals are collected, stored and used as data to characterize the sample, for instance, to generate a map of the surface of the sample.

In this regard, when operating in an oscillating mode, ideal operation can only be realized when the cantilever is caused to oscillate at resonance. Therefore, the response of the cantilever over a range of frequencies is typically measured to determine at which frequency a maximum amplitude signal is achieved. One typical problem when conducting this preliminary operation, called tuning, is that the true mechanical resonance of the cantilever may be difficult to determine due to unwanted vibrations in the system. Such vibrations can cause mechanical resonance curves that contain peaks at frequencies near the resonant frequency of the probe, or harmonics thereof, thus making it difficult to distinguish the true mechanical resonance of the probe.

AFM users know that it is common to observe unexpected resonance spectra, such as bumps or dips, close to or even just at resonance. If these imperfections coincide with the desired frequency range that the cantilever is to vibrate, they will interfere with Imaging and result in degraded images, as well as degraded tip life. On the other hand, if such imperfections are out of the frequency range of interest, they will not interfere with the measurements.

Most often, the probe itself is not to blame for non-ideal resonance curves. AFM probes are micromechanical devices, typically built on single crystal silicon using known semiconductor microfabrication techniques. Well-known silicon fabrication technology enables accurate control over both geometrical and mechanical properties of probe assemblies. Probes having reliable mechanical characteristics and which are very stable can be achieved with these techniques. When isolated, the resonance spectra of such cantilevers are clear and free of unwanted vibrations. As shown in FIGS. 1 and 2, a probe assembly 10 includes a base or die section 12 which supports a probe 14 preferably fabricated from the same material, for example, a silicon wafer. Base 12 includes a first surface 16 and a second, generally opposed bottom surface 18 each of which is substantially flat, continuous and planar. Probe 14 includes a cantilever 20 and has a free end 22 that oscillates a tip 24 which is supported at free end 22 and includes an apex 26 that interacts with the sample under test. In operation, energy from an oscillating transducer (not shown) is coupled through the base 12 of probe assembly 10 to cantilever 20 of probe 14 to cause cantilever 20, and thus tip 24, to oscillate. The transducer is driven by an oscillating source having a frequency selected to cause cantilever 20 to oscillate at its resonance. As noted previously, the resonant frequency is an inherent property of the corresponding probe 14. Notably, it is the imperfect coupling of the energy to the probe 14 that can produce less than ideal performance of the scanning probe microscope.

Because mechanical properties of probe assemblies can be accurately controlled using known techniques, the probe assemblies themselves are typically not the source of unwanted vibrations in the system. Most often, poor mechanical resonance curves produced during tuning are caused by imperfect mounting of the cantilever. More particularly, this problem can often be isolated as an imperfect mechanical interface between the probe assembly and the cantilever holder, which compromises coupling of the oscillating energy produced by the oscillating transducer to the probe tip.

FIG. 3 shows an example of a double resonance peak in the response of a cantilever as frequency is swept over a range of about one kilohertz. More particularly, the amplitude response shown has two peaks, A and B, near the resonance frequency (308.80 kHz) of the probe of the AFM being tuned. Note that the phase response is also illustrated in FIG. 3, and although providing information regarding the imperfect tune, the amplitude response provides a more stark illustration of the problem.

As noted above, the double resonance peak shown is most often caused by the way the cantilever is mounted in the cantilever holder, rather than by the cantilever itself. An illustration of an AFM probe assembly 30 mounted in a probe holder 32 is illustrated in FIG. 4. Particularly, probe holder 32 may be a spring loaded clip having two generally opposed portions 34, 36 separated at least at one end by a support 38. Portions 34, 36 are biased against one another in this arrangement by a spring element 40 having a spring constant sufficient to secure probe 30 within holder 32 during AFM operation. Preferably, a bottom or inside surface 42 of portion 34 supports a transducer such as a piezoelectric actuator 44 that may be actuated via electrical leads (not shown) to, for instance, cause probe 46, of probe assembly 30 to vibrate. The energy generated by piezoelectric actuator 44 is coupled to probe 46 and specifically tip 48 supported by a cantilever 50 of probe 46, to oscillate tip 48 ideally at a resonance associated with probe 46. Preferably, piezoelectric actuator 44 is bonded to surface 42 of portion 34 using glue or a weld such that a surface 52 of actuator 44 defines an interface "I" between actuator 44 of probe holder 32 and probe assembly 30.

As to the cause of the response shown in FIG. 3 and described above, often times particulate matter 60 may be lodged in one of the mechanical interfaces, for example, between piezoelectric actuator 44 causing the oscillation and a base or die 54 of probe assembly 30, as shown in FIG. 4. Such matter 60 sandwiched in mechanical interface "I" causes, in this case, only a small region of contact "X" between actuator 44 and base 54 of probe assembly 30. As a result, coupling of the energy generated by piezoelectric actuator 44 to cantilever 50, and ultimately to tip 48, of probe assembly 30 is imperfect. Ideally, surface 52 of actuator 44 of probe holder 32 should lie flat or adjacent to as much of surface 56 of probe assembly 30 as possible (i.e., without interfering obstructions) to maintain a high integrity interface between the two, thus optimizing the energy coupled to probe 30.

In the past, when encountering an imperfect cantilever tune caused by a compromised mechanical interface (typically discovered by monitoring the operation of the cantilever while conducting a frequency sweep, i.e., when tuning the AFM for operation), the user simply adjusted (e.g., agitated) the probe assembly in the holder to try to improve the mechanical interface, for example, by dislodging any interfering particulate matter. At this point, the user would conduct another frequency sweep to determine whether a "clean" response results. If an imperfect tune persists, the user typically would then clean the probe holder 32, preferably with a swab of alcohol. If after performing these steps a clean profile is still not obtained, the user typically would replace the cantilever holder 32. Notably, the cause of an imperfect tune in this case often is due to the user employing a cantilever having a die thicker than 300 microns, or using a holder (e.g., a spring clip) that is stressed, for example, after repeated uses. Alternatively, the cause may be that the solder around the screw in the cantilever holder is cracked or compromised in some way.

The problems associated with such known methods of obtaining clean mechanical resonance curves are numerous. For instance, having to conduct a tune and analyze the output, and then having to remove and adjust the probe assembly with respect to the probe holder is time consuming. Such adjustments are annoying and often times do not resolve the problem and, in the end, interfere with the operator's use of the AFM. Moreover, if the adjustment of the probe assembly in the probe holder does not produce the desired result, the user must take further measures to resolve the problem, such as cleaning the probe holder. This leads to additional handling of the relatively delicate probe assembly, and again further delays use of the AFM and yet still does not guarantee that the AFM will be ready to use. And, if such known methods do not resolve the problem, the probe holder may have to be replaced entirely, clearly leading to more expense and a further overall delay in operating the SPM.

Alternatively, to minimize the risk of a compromised interface between the probe assembly and the probe holder, the user may glue the probe assembly to the probe holder, and more particularly the piezoelectric actuator to the probe holder. Although an effective resolution to achieving a solid mechanical interface between the probe assembly and the probe holder, and thus a clean mechanical resonance curve, the most significant problem associated with gluing the probe assembly to the probe holder is that often times during operation, the probe assembly must be replaced. For instance, this may occur because a tip of the probe assembly becomes damaged, or a cantilever having an alternate resonance frequency would be preferable based on the type of application. To remove a glued probe assembly from a probe holder, a solution, such as acetone, is required to break the glue bond. The problems associated with gluing the probe assembly are numerous. The process is laborious and time-consuming and requires further handling of the delicate components.

As a result, the field of AFM operation was in need of a tuning solution that makes obtaining clean mechanical resonance curves efficient. A method and/or apparatus is desired that minimizes the amount of the user's time to prepare the AFM for operation, yet maintains flexibility in terms of exchange of probe assemblies.

SUMMARY OF THE INVENTION

The present invention is directed to a unique probe assembly design and method that achieves an improved mechanical interface between the piezoelectric actuator and the tip it is oscillating during AFM operation, thus minimizing the need to adjust or clean the interfacing components. In the preferred embodiment, the surface area of the probe assembly die that interfaces with the probe holder, including the piezoelectric actuator, is minimized.

According to one aspect of the preferred embodiment, a method of operating a probe-based instrument includes providing a probe assembly and a probe holder, and oscillating a probe of the probe assembly with an actuator. The method also includes mounting the probe assembly on the probe holder so as to lessen interference with the oscillation energy coupled to a tip of the probe.

According to another aspect of this preferred embodiment, the mounting step includes placing a surface of the probe assembly adjacent to an interface surface of the probe holder. In this case, the contact surface area of the probe assembly surface is substantially less than a contact surface area of the interface surface.

In another aspect of this preferred embodiment, the probe assembly surface includes at least one opening formed therein. Alternatively, the interface surface includes a plurality of openings formed therein, while the plurality of openings may be equally spaced such that the probe assembly surface forms a grid.

According to a further aspect of this preferred embodiment, the mounting step includes forming a probe assembly surface to interface with a probe holder surface to lessen oscillation resonances other than a characteristic oscillation resonance of the probe of the probe assembly.

According to another aspect of the preferred embodiment, a probe assembly for a scanning probe microscope includes a base having two substantially opposed surfaces and a cantilever extending from the base and supporting a tip. The probe assembly is mounted in a probe holder such that a probe holder surface contacts one of the opposed surfaces. The one opposed surface preferably includes at least one opening such that the surface area of the one opposed surface is substantially less than the surface area of the probe holder surface.

According to a still further aspect of the preferred embodiment, an apparatus includes a probe holder having an actuator that produces an oscillation energy. Preferably, the actuator defines a probe holder surface. A probe assembly having a tip is also provided. The probe assembly is mounted in the probe holder so as to maximize the oscillation energy coupled to the tip.

In yet another aspect of this preferred embodiment, a probe assembly is mounted such that a probe assembly surface contacts the probe holder surface. A contact surface area of the probe assembly surface may be substantially less than a corresponding contact surface area of the probe holder surface. The probe assembly surface includes at least one opening and may include a plurality of equally spaced openings.

According to another embodiment of the present invention, a probe assembly of a probe-based instrument includes a base, a probe and a means for lessening resonances other than a characteristic resonance of the probe.

In another aspect of the preferred embodiment, a method of operating a probe-based instrument includes providing a probe assembly and a probe holder. The method is employed to generate an oscillation energy so as to oscillate a tip of the probe assembly during operation. The method also includes mounting the probe assembly on the probe holder so as to reduce unwanted resonance peaks in a resonance curve associated with the probe-based instrument.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

Figure 4:
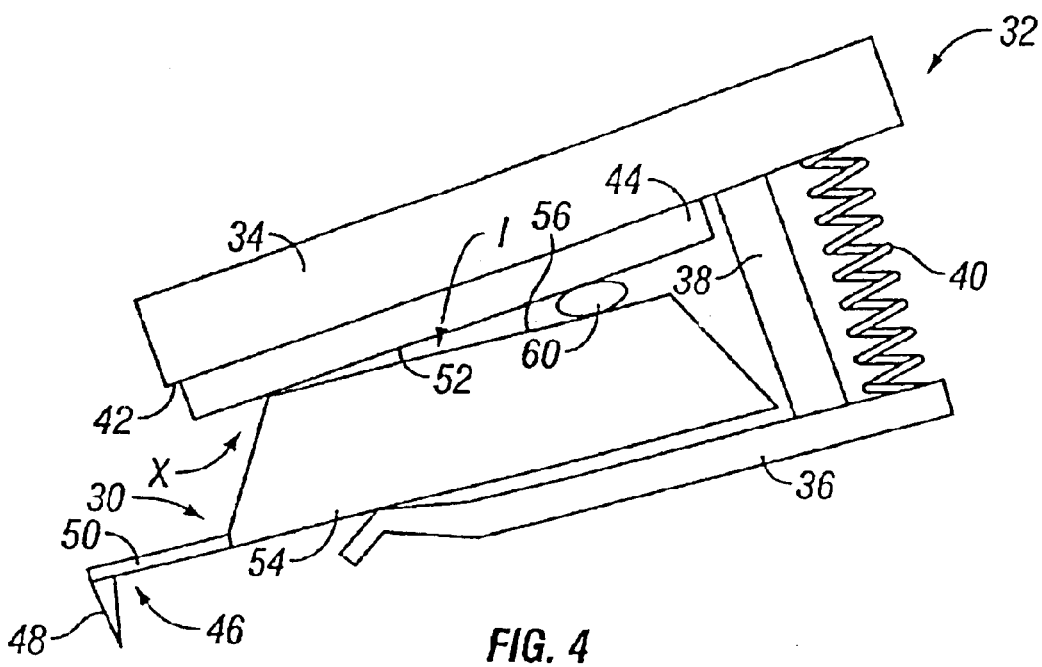
FIG. 4 is a side elevational view of a probe assembly mounted within a probe holder.

In an effort to achieve more ready tuning of an AFM, the focus of the preferred embodiment was placed on lessening and minimizing the affect of unwanted resonances introduced to the system from various sources, such as contaminant matter (e.g. dust, etc.) in the operating environment. In this regard, to minimize the chance that particulate matter, such as that shown in FIG. 4, affects the response of the probe during a tune, an alternate probe assembly design is described herein. The solutions allow a minimum of tampering with the probe assembly, yet still maintain the benefit of easy exchange of the probe assembly if a catastrophic failure such as a broken tip occurs during operation.

Figure 1:
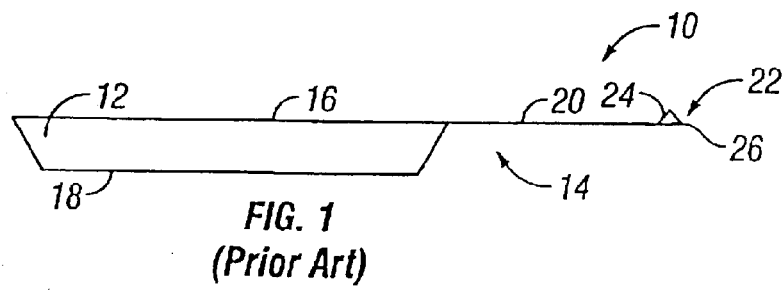
FIG. 1 is a schematic side elevational view of a prior art probe assembly.
Figure 2:
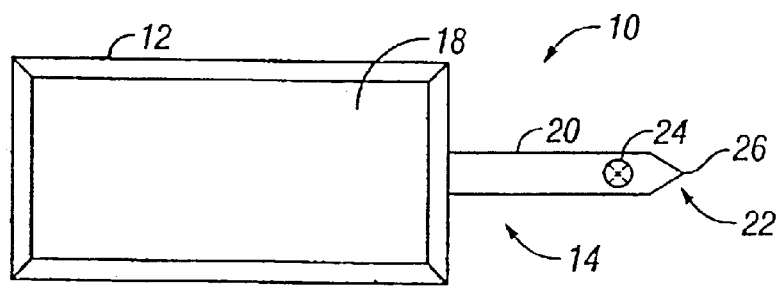
FIG. 2 is a bottom view of the probe assembly of FIG. 1.
Figure 3:
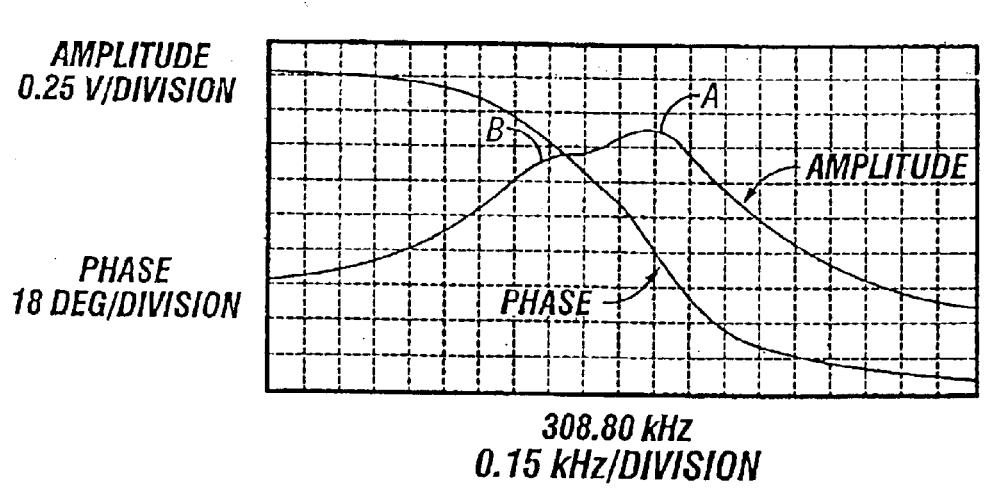
FIG. 3 is a graph illustrating a cantilever response, both amplitude and phase, including multiple resonance peaks.
Figure 5A:
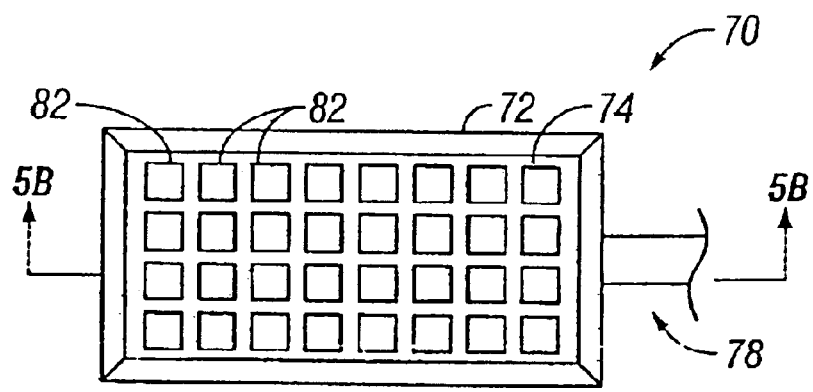
FIG. 5A is a bottom view of a probe assembly according to the preferred embodiment.
Figure 5B:
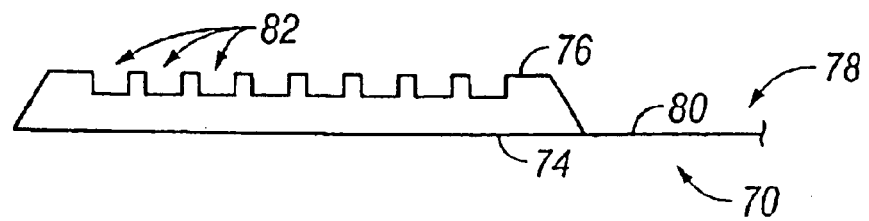
FIG. 5B is a cross-sectional view of the probe assembly of FIG. 5A.

Turning to FIGS. 5A and 5B, the first solution involves modifying the geometry of a base or die section of the probe assembly so as to minimize the affects of particulate matter interfering with the response of the cantilever. Particularly, the base of the probe assembly is configured to minimize the chance that, for instance, particulate matter (FIG. 4), causes the problem shown in FIG. 3. In the present case, such matter has a better chance of not interfering with the interface "I" between the generally planar surface 52 of the piezoelectric actuator (44 in FIG. 4) and the corresponding surface, such as surface 56 in FIG. 4.

In FIGS. 5A and 5B, a probe assembly 70 includes a base 72 having a first top surface 74 and a second, generally opposite bottom surface 76. A probe 78 having a cantilever 80 is supported by base 72 from its first surface 74. One way in which the adverse affects associated with unwanted particles lodged at the probe-probe holder interface are minimized is by forming base 72 to include a plurality of openings 82, for example, as a grid. Openings 82 minimize the surface area of surface 76 that interfaces with a corresponding planar surface of the probe holder, namely, the planar non-bonded surface of the piezoelectric actuator (such as surface 52 of actuator 44 in FIG. 4). The openings provide a housing for any particulate matter to reside without interfering with the interface between the probe assembly base and the piezoelectric actuator of the probe holder. As a result, the energy produced by the piezoelectric actuator is only coupled through the base and ultimately to the tip, i.e., without interference from the particulate matter. Notably, the fact that less surface area of surface 76 of base 72 of probe assembly 70 interfaces with the piezoelectric transducer (44 in FIG. 4) does not compromise the coupled energy or the security of the probe within the probe holder.

The way in which the openings are formed can be many. An etch operation may be performed once the probe assembly is fabricated. Alternately, lithographic techniques using a mask and an appropriate photoresist, or any other conventional technique, could be used to produce openings 82. Overall, the less surface area of surface 76 that interfaces with or contacts the corresponding contact surface of the probe holder, e.g., the planar surface of the piezoelectric actuator, the less likely a particle will compromise the probe holder-probe interface, and the more likely the user is to get a single desired resonance peak when tuning the AFM.

Figure 6:
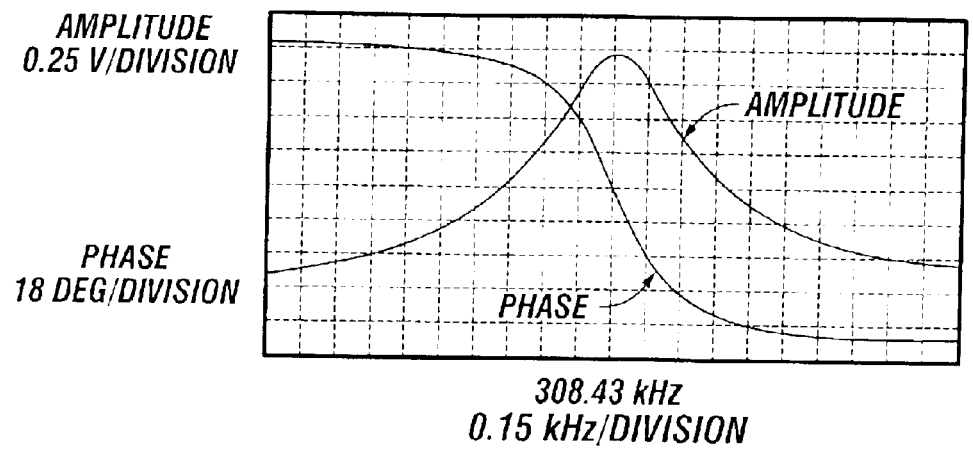
FIG. 6 is a graph illustrating a response of an AFM cantilever, including both amplitude and phase responses, including a single resonance peak.

When configuring the probe assembly as shown in FIG. 5A, for instance, the frequency sweep that is conducted during the tuning of the AFM has a significantly better chance of producing the response shown in FIG. 6 than when using a conventional probe assembly design. Clearly, in this case, the resonance of the probe assembly can be identified at approximately 308.43 kHz where the amplitude is the greatest. In addition, the phase response is similarly free of data corresponding to unwanted resonances. As a result, the preferred embodiment more readily achieves cantilever tuning without cleaning, etc., and yet maintains operational flexibility in that probe assemblies may be easily exchanged.

Figure 7A:
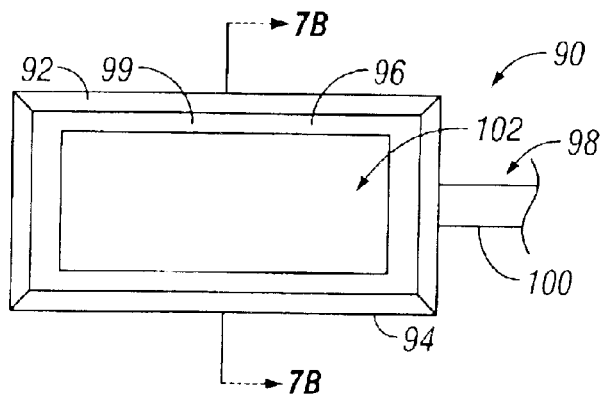
FIG. 7A is a bottom view of a probe assembly according to an alternate embodiment.
Figure 7B:
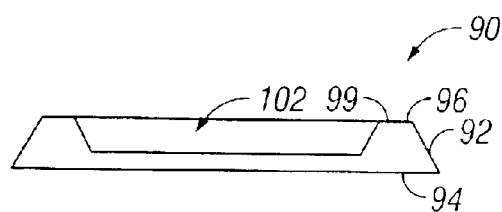
FIG. 7B is a cross-sectional view of the probe assembly of FIG. 7A.

In an alternate embodiment, a probe assembly 90 has a base 92 formed in an alternate configuration. Turning to FIGS. 7A and 7B, rather than a series or grid of openings 80 as shown in FIGS. 5A and 5B, a single rectangular opening is formed in base 92 of probe assembly 90. More particularly, base 92 has a first top surface 94 and a second generally opposite surface 96. First surface 94, like the previous embodiments, supports a probe 98 defining a cantilever 100 formed, for example, from a silicon wafer. An opening 102 is preferably formed in surface 96 during fabrication of probe assembly 90. In this case, the surface area that interfaces with the planar surface of the piezoelectric actuator is around the perimeter 99 of surface 96 of base 92 of probe assembly 98 at perimeter region 99. The contact surface of the probe assembly in this case is thus the surface area of the perimeter region 99. Again, similar to the embodiment shown in FIGS. 5A and 5B, any particulate matter that falls in the center section of the probe assembly will not interfere with the energy coupled from the piezoelectric actuator ultimately to the tip of probe 98. As a result, a more clean resonance response for the AFM can be achieved during tuning.

Figure 8:
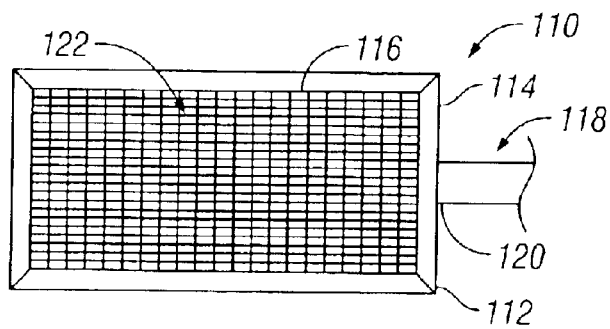
FIG. 8 is a bottom view of a probe assembly according to another alternate embodiment.

In a still further embodiment, turning to FIG. 8, a probe assembly 110 includes a die section 112 having a top surface 114 (supporting a probe 118 having a cantilever 120) and a bottom surface 116. Bottom surface 116 interfaces, for example, a corresponding surface of a piezoelectric actuator and may be formed so as to define a mesh-like surface 122 with minimal surface area. Similar to the other embodiments, minimal surface area of probe base interfaces with the probe holder, thus improving AFM tuning.

Although the best mode contemplated by the inventors of carrying out the present invention is disclosed above, practice of the present invention is not limited thereto. Other methods of monitoring the adverse affects of foreign matter in the system may be employed alone or in combination with the present embodiments. For instance, although the above embodiments focus on minimizing the surface area of the surface of the base that interfaces with the probe holder (e.g., the actuator coupled thereto), a highly biased clip could be used to eliminate the adverse effects caused by foreign particulate matter by essentially crushing such particles so they do not interfere with the coupling of the oscillation energy. It will be manifest that various additions, modifications and rearrangements of the features of the present invention may be made without deviating from the spirit and scope of the underlying inventive concept. The scope of still other changes to the described embodiments that fall within the present invention but that are not specifically discussed above will become apparent from the appended claims.

What is claimed is:

1. A method of operating a probe-based instrument comprising the steps of:

providing a probe assembly and a probe holder;

oscillating a probe of the probe assembly with an actuator that generates oscillation energy; and mounting the probe assembly on the probe holder so as to substantially eliminate interference with the oscillation energy coupled to the tip, wherein said mounting step includes placing a surface of the probe assembly adjacent to an interface surface of the probe holder, and wherein a contact surface area of the probe assembly surface is substantially less than a a surface area of the interface surface.

2. The method of claim 1, wherein the actuator is coupled to the probe holder such that the actuator defines the interface surface.

3. The method of claim 1, wherein the probe assembly surface includes at least one opening formed therein.

4. The method of claim 3, wherein the interface surface includes a plurality of openings formed therein.

5. The method of claim 4, wherein the plurality of openings are equally spaced such that the probe assembly surface is a grid.

6. A probe assembly for a scanning probe microscope, the probe assembly comprising:

a base having two substantially opposed surfaces;

a cantilever extending from said base and supporting a tip; and wherein the probe assembly is mounted in a probe holder such that a probe holder surface contacts one of said opposed surfaces, and wherein at least one of said one opposed surface and said probe holder surface includes at least one opening such that the contact surface area of the at least one surface having at least one opening is substantially less than the surface area of the other of said probe holder surface and said one opposed surface.

7. The probe assembly of claim 6, wherein said contact surface area of said one opposed surface is defined by a perimeter region.

8. An apparatus comprising:

a probe holder including an actuator that produces an oscillation energy, said actuator defining a probe holder surface;

a probe assembly having a tip and a probe assembly surface; and wherein said probe assembly is mounted in said probe holder so as to provide space to accommodate contamination between said probe holder and said probe assembly; and wherein said probe holder surface interfaces with said probe assembly surface such that said probe holder surface and said probe assembly surface are substantially parallel.

9. The scanning probe microscope of claim 8, wherein said probe assembly is mounted such that said probe assembly surface contacts said probe holder surface, and wherein a contact surface area of said probe assembly surface is substantially less than the surface area of said probe holder surface.

10. The scanning probe microscope of claim 9, wherein said probe assembly surface includes at least one opening to accommodate the contamination.

11. The scanning probe microscope of claim 10, wherein said at least one opening includes a plurality of equally spaced openings.

12. The scanning probe microscope of claim 9, wherein said probe assembly surface is formed to substantially eliminate oscillation resonances other than the characteristic oscillation resonance of a probe of the probe assembly.

13. A method of operating a probe-based instrument comprising the steps of:

providing a probe assembly and a probe holder;

generating an oscillation energy;

oscillating a tip of the probe assembly with the oscillation energy; and mounting the probe assembly on the probe holder so as to substantially eliminate unwanted resonance peaks in a resonance curve associated with the probe-based instrument, wherein said mounting step includes forming at least one opening in a base of the probe assembly so as to accommodate contaminant material.

14. The method of claim 13, wherein said opening lies generally adjacent to a surface of the probe holder.

15. The method of claim 14, wherein the probe holder surface is defined by an actuator.

16. A scanning probe microscope comprising:

a probe having a surface;

a probe holder having an interface surface, said probe holder retaining said probe such that said probe surface is adjacent to said interface surface; and wherein said probe surface and said interface surface are configured to accommodate contaminant material when coupled so as to substantially eliminate unwanted resonance peaks in a resonance curve associated with the probe.

* * * * *

UNITED STATES PATENT AND TRADEMARK OFFICE
CERTIFICATE OF CORRECTION

| | |
|---|---|
| PATENT NO. | : 6,912,893 B2 |
| APPLICATION NO. | : 10/417506 |
| DATED | : July 5, 2005 |
| INVENTOR(S) | : Stephen C. Minne et al. |

It is certified that error appears in the above-identified patent and that said Letters Patent is hereby corrected as shown below:

IN THE CLAIMS

CLAIM 1, column 7, line 41, delete "the" and substitute therefore -- a --.
(Applicant's Error)

CLAIM 1, column 7, line 45, delete duplicate "a".

Signed and Sealed this

Eleventh Day of July, 2006

JON W. DUDAS
*Director of the United States Patent and Trademark Office*